(12) United States Patent
Yano (10) Patent No.: US 10,061,133 B2
(45) Date of Patent: Aug. 28, 2018

(54) OPTICAL ELEMENT AND DISPLAY APPARATUS

(71) Applicant: Seiko Epson Corporation, Tokyo (JP)

(72) Inventor: Kunihiko Yano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/278,251

(22) Filed: May 15, 2014

(65) Prior Publication Data

US 2014/0340759 A1 Nov. 20, 2014

(30) Foreign Application Priority Data

May 16, 2013 (JP) ................................. 2013-103792

(51) Int. Cl.
*G02B 27/14* (2006.01)
*G02B 5/08* (2006.01)
*G02B 27/01* (2006.01)

(52) U.S. Cl.
CPC ............ *G02B 27/142* (2013.01); *G02B 5/085* (2013.01); *G02B 27/0172* (2013.01)

(58) Field of Classification Search
CPC ........................... G02B 27/0101; G02B 27/142
USPC ................. 359/359, 634, 584–589, 629, 630
See application file for complete search history.

(56) References Cited

U.S. PATENT DOCUMENTS

| 3,559,090 A | 1/1971 | Refermat et al. | |
| 4,333,983 A * | 6/1982 | Allen | B29D 11/0073 359/588 |
| 4,367,921 A * | 1/1983 | Sawamua et al. | 359/586 |
| 4,415,233 A | 11/1983 | Itoh et al. | |
| 4,973,836 A | 11/1990 | Matsuoka | |
| 5,424,876 A * | 6/1995 | Fujii | G02B 1/105 359/584 |
| 6,219,188 B1 * | 4/2001 | Tsukamoto | 359/629 |
| 2005/0207020 A1 * | 9/2005 | Kawamura | G02B 5/3083 359/634 |
| 2006/0187551 A1 * | 8/2006 | Huang | G02B 5/0858 359/582 |

(Continued)

FOREIGN PATENT DOCUMENTS

| JP | 56-027106 A | 3/1981 |
| JP | 57-130001 | 8/1982 |

(Continued)

*Primary Examiner* — Bumsuk Won
*Assistant Examiner* — Wen Huang
(74) *Attorney, Agent, or Firm* — ALG Intellectual Property, LLC (57) ABSTRACT

In an optical element, a half mirror layer includes a silver layer, a first dielectric multilayer film that is provided between the silver layer and a first translucent member made of resin, and a second dielectric multilayer film that is provided on the opposite side to the first translucent member with respect to the silver layer. The first dielectric multilayer film includes a first aluminum oxide layer that is in contact with the silver layer, and a titanium oxide layer that is in contact with the first aluminum oxide layer on the first translucent member side. The second dielectric multilayer film includes a zirconium oxide layer (zirconium oxide-based dielectric layer) and a second aluminum oxide layer that is in contact with the zirconium oxide layer, and one of the second aluminum oxide layer and the zirconium oxide layer is in contact with the silver layer.

15 Claims, 8 Drawing Sheets

(56) References Cited

U.S. PATENT DOCUMENTS

2012/0200937 A1    8/2012  Totani et al.
2013/0335828 A1   12/2013  Totani et al.
2016/0306174 A1   10/2016  Totani et al.

FOREIGN PATENT DOCUMENTS

| JP | 60-028601 A  | 2/1985  |
| JP | 63-249945    | 10/1988 |
| JP | 11-142623 A  | 5/1999  |
| JP | 11-249067 A  | 9/1999  |
| JP | 2001-013308 A| 1/2001  |
| JP | 3563955      | 9/2004  |
| JP | 04482971     | 4/2010  |
| JP | 2010-230771 A| 10/2010 |
| JP | 2012-163658 A| 8/2012  |
| JP | 2012-242674  | 12/2012 |
| WO | WO199906490 A| 12/1999 |

* cited by examiner

OPTICAL ELEMENT AND DISPLAY APPARATUS

BACKGROUND

1. Technical Field

The present invention relates to an optical element including a half mirror and a display apparatus including an optical element.

2. Related Art

In a head mounted display in which both of image information emitted from an image light emitting device and image information on the external environment can be observed in the same visual field, image light is reflected toward eyes of an observer and a half mirror which allows the light from the external environment to be transmitted to the eyes of the observer is used.

As the half mirror, for example, a configuration in which a metal thin film is interposed between translucent films is proposed (see U.S. Pat. No. 3,559,090 and Japanese Patent No. 3563955). In addition, in Japanese Patent No. 3563955, layer configurations of a substrate/silicon oxide layer/zirconium oxide layer or a titanium oxide layer/chrome layer/silver layer/aluminum oxide layer/zirconium oxide layer/silicon oxide layer are proposed.

In the half mirror disclosed in Japanese Patent No. 3563955, since a chrome layer is formed as a base layer of a silver layer for improving an adhesion property or the like with a lower layer side of the silver layer, there is a problem in that a loss in light quantity due to the chrome layer is large. Further, in a case of using a resin substrate as a substrate, even when the chrome layer is omitted after the problem of the adhesion property of the silver layer is solved, there is a problem in that the density of the silver layer or a dielectric film decreases due to the influence of moisture adsorbed by the resin substrate and an organic component desorbed from the resin substrate, so optical characteristics are degraded due to diffusion of silver particles or modification of the silver layer.

SUMMARY

An advantage of some aspects of the invention is to provide an optical element in which a half mirror layer with stabilized optical characteristics can be disposed on a translucent member made of a resin even when a loss in light quantity is suppressed by omitting a base metal film with respect to a silver layer and a display apparatus.

According to an aspect of the invention, there is provided an optical element which includes a first translucent member that contains a resin material and a half mirror film that is formed on at least one surface of the first translucent member. The half mirror film includes a silver film, a first dielectric multilayer film that is positioned between the silver film and the first translucent member, and a second dielectric multilayer film that is positioned on the opposite side to the first translucent member with respect to the silver film. The first dielectric multilayer film includes a first aluminum oxide film that is in contact with the silver film and a titanium oxide film that is in contact with the first aluminum oxide film on the first translucent member side. The second dielectric multilayer film includes a zirconium oxide-based dielectric film that contains zirconium oxide and a second aluminum film that is in contact with the zirconium oxide-based dielectric film. One of the second aluminum oxide film and the zirconium oxide-based dielectric film is in contact with the silver film.

In the aspect of the invention, since the silver film is used as the metal film of the half mirror film, a loss due to adsorption is lower than when compared to a case of using aluminum, and a film can be stably formed because a relatively thick film can be used. Further, in the aspect of the invention, since a member containing a resin material is used as the first translucent member, the degree of freedom in shape is high and reduction in weight can be attempted. In addition, when a resin is used for the first translucent member, there is a concern that moisture or an organic component desorbed from a resin can decrease the quality of the silver film and other dielectric films, but, in the aspect of the invention, a titanium oxide film is used for a high refractive index film being provided on the first dielectric multilayer film (lower layer side of the silver film), so a film can be formed at a relatively low temperature by an ion assisted method with such titanium oxide film. Accordingly, it is possible for the titanium oxide film to prevent desorption of moisture or an organic component from a resin, and it is possible to prevent decrease in the quality of the silver film or the dielectric film due to the moisture or the organic component desorbed from a resin. Further, absorption and scattering of light on the silver film become greater when the silver film is directly provided on the titanium oxide film, but absorption and scattering of light on the silver film can be suppressed because the first aluminum oxide film is provided between the titanium oxide film and the silver film in the invention. Furthermore, since the zirconium oxide-based dielectric film (a single film of zirconium oxide or a mixed film of zirconium oxide and titanium oxide) is used as the high refractive index film being provided on the second dielectric multilayer side (upper layer side of the silver film), damage to the silver film is small which is different from the case of using titanium oxide. In addition, the zirconium oxide-based dielectric film or the second aluminum oxide film can be formed as a dense film, so such films can be used to block moisture and degradation of optical characteristics of the half mirror caused due to a reaction with the moisture of the silver film can be suppressed.

In the aspect of the invention, it is preferable that the zirconium oxide-based dielectric film be a mixed film of zirconium oxide and titanium oxide.

In the aspect of the invention, it is preferable that the first dielectric multilayer film contain a third aluminum oxide film that is in contact with the titanium oxide film on the opposite side to the first aluminum oxide film.

In the aspect of the invention, it is preferable that the zirconium oxide-based dielectric film be in contact with the silver film on the second dielectric multilayer film.

In the aspect of the invention, it is preferable that the second aluminum oxide film be in contact with the silver film on the second dielectric multilayer film.

In the aspect of the invention, it is preferable that the optical element further include a second translucent member that is positioned on the opposite side to the first translucent member with respect to the half mirror film and the second translucent member have the same refractive index as that of the first translucent member.

According to another aspect of the invention, there is provided a display apparatus including the optical element according to the aspect of the invention. The display apparatus includes an image light emitting device that emits image light. The optical element includes a light incident portion to which the image light from the image light emitting device is incident and a light emitting portion in which at least a part of the image light incident from the light incident portion is reflected on the half mirror film to be emitted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described. Further, in the accompanying drawings referred to in the following description, since the size of each layer and each member is adjusted to be recognizable, the scales of each layer and each member are different from the actual scales.

First Embodiment

Figure 1A:
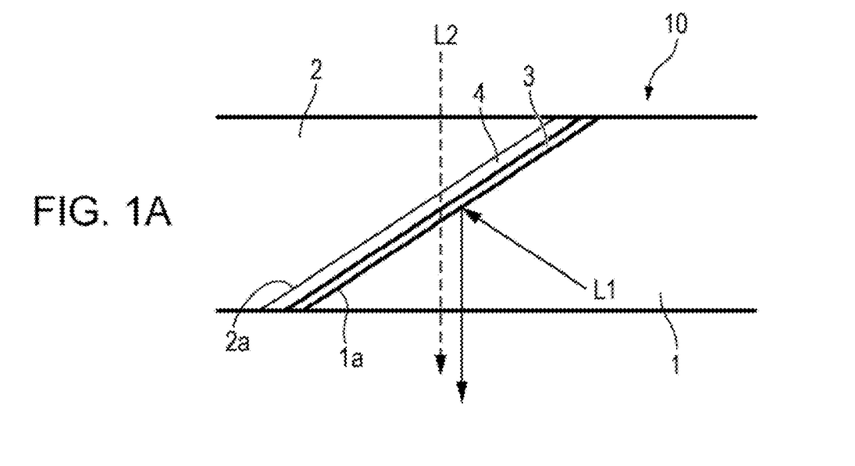
FIGS. 1A to 1C are explanatory diagrams showing an example of a half mirror according to a first embodiment of the invention.
Figure 1B:
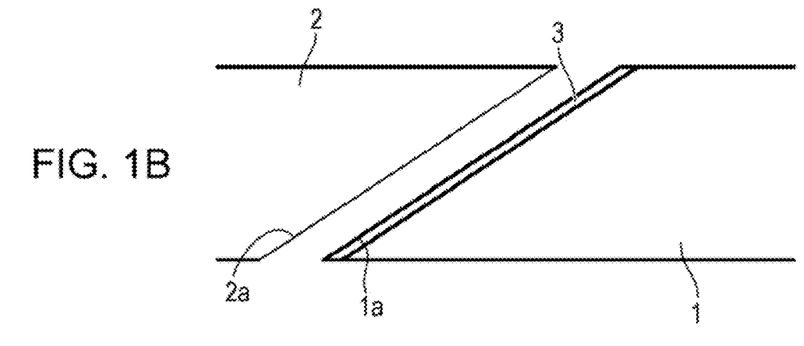
Figure 1C:
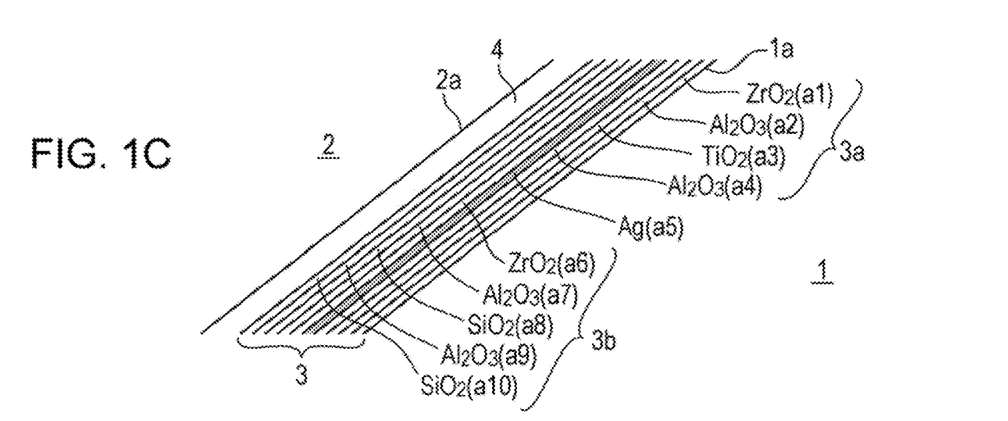

FIGS. 1A to 1C are explanatory diagrams showing an example of a half mirror according to a first embodiment of the invention. FIG. 1A is an explanatory diagram schematically showing a cross-sectional configuration of the half mirror, FIG. 1B is an explanatory diagram showing a state before the half mirror is made by bonding two translucent members, and FIG. 1C is an explanatory diagram of a half mirror layer.

An optical element 10 shown in FIG. 1A has a configuration in which two translucent members are bonded to each other through an adhesive layer 4 by interposing a half mirror layer 3 therebetween. More specifically, the optical element 10 includes a first translucent member 1, a second translucent member 2, the half mirror layer 3 formed between the first translucent member 1 and the second translucent member 2, and the adhesive layer 4 formed between the half mirror layer 3 and the second translucent member 2.

In the embodiment, the first translucent member 1 is a resin formed of a polymer or a copolymer such as a cyclo-olefin polymer, a cyclo-olefin copolymer, an acrylic resin, a polycarbonate resin, or a styrene resin and is a member produced by metal molding. The second translucent member 2 is a resin formed of a polymer or a copolymer such as a cyclo-olefin polymer, a cylo-olefin copolymer, an acrylic resin, a polycarbonate resin, or a styrene resin in the same manner as that of the first translucent member 1. In the embodiment, the first translucent member 1 and the second translucent member 2 are formed of same resin materials and the refractive indices thereof are the same as each other. The adhesive layer 4 is an acrylic-based or epoxy-based ultraviolet curable adhesive and has translucency.

The first translucent member 1 is a plate-like member or a block-like member produced by the metal molding. In the first translucent member 1, a first surface 1a being bonded to the second translucent member 2 is a slope inclined with respect to the both surfaces of the first translucent member 1, and the half mirror layer 3 is formed on such first surface 1a. The second translucent member 2 is a plate-like member or a block-like member produced by the metal molding in the same manner as that of the first translucent member 1, and a second surface 2a being bonded to the first translucent member 1 is a slope inclined with respect to the both surfaces of the second translucent member 2.

In the optical element 10 with the configuration described above, as shown by a solid arrow in FIG. 1A, image light L1 traveling inside of the first translucent member 1 is reflected on the half mirror layer 3 and emitted from one surface side of the optical element 10. In addition, as shown by a dashed arrow in FIG. 1A, external light L2 incident to the second translucent member 2 from another surface side of the optical element 10 is transmitted through the half mirror layer 3 and emitted from one surface side of the optical element 10.

In order to produce such optical element 10, the half mirror layer 3 is formed on the first surface 1a of the first translucent member 1 as shown in FIG. 1B, and the second translucent member 2 is bonded to the half mirror layer 3 by the adhesive layer 4 on the opposite side to the first translucent member 1 as shown in FIG. 1A. Configuration of half mirror layer 3

As shown in FIG. 1C, the half mirror layer 3 includes a silver layer (Ag), a first dielectric multilayer film 3a provided between the silver layer and the first translucent member 1, and a second dielectric multilayer film 3b provided on the opposite side to the first translucent member 1 with respect to the silver layer.

The first dielectric multilayer film 3a includes first aluminum oxide layer in contact with the silver layer and a titanium oxide layer in contact with the first aluminum oxide layer on the first translucent member 1 side as described below with reference to Table 1. In addition, the first dielectric multilayer film 3a includes a third aluminum oxide layer in contact with the titanium oxide layer on the opposite side to the first aluminum oxide layer.

The second dielectric multilayer film 3b includes a zirconium-based dielectric layer formed of a single film of zirconium oxide and a second aluminum oxide layer in contact with the zirconium oxide layer, and one of the second aluminum oxide layer and the zirconium oxide layer is in contact with the silver layer. In the embodiment, the zirconium oxide layer (sixth layer a6) is in contact with the silver layer (fifth layer a5) as described below with reference to Table 1.

More specifically, in the optical element 10 of the embodiment, the half mirror layer 3 is a multilayer film on which ten layers of thin films to be described below are laminated, and refractive indices and film thicknesses of respective layers are listed in Table 1. Further, in the embodiment, both of the first translucent member 1 and the second translucent member 2 are cyclo-olefin polymers (refractive index=1.54).

TABLE 1

| Layer | Material | Refractive index | Film thickness (nm) | |
|---|---|---|---|---|
| a1 | $ZrO_2$ | 2.02 | 23.6 | |
| a2 | $Al_2O_3$ | 1.57 | 13.1 | 3a |
| a3 | $TiO_2$ | 2.40 | 57.7 | |
| a4 | $Al_2O_3$ | 1.57 | 4.4 | |
| a5 | Ag | 0.06 | 17.0 | |
| a6 | $ZrO_2$ | 2.02 | 52.2 | |
| a7 | $Al_2O_3$ | 1.57 | 4.4 | |
| a8 | $SiO_2$ | 1.46 | 641.0 | 3b |
| a9 | $Al_2O_3$ | 1.57 | 16.5 | |
| a10 | $SiO_2$ | 1.46 | 54.7 | |

First, in the first dielectric multilayer film 3a of the half mirror layer 3, a first layer a1 is formed of zirconium oxide ($ZrO_2$) which is formed by a vacuum deposition or the like and the refractive index and the film thickness thereof are 2.02 nm and 23.6 nm respectively. A second layer a2 (third aluminum oxide layer) is formed of aluminum oxide ($Al_2O_3$) which is formed by the vacuum deposition or the like and the refractive index and the film thickness thereof are 1.57 nm and 13.1 nm respectively. A third layer a3 is formed of titanium oxide ($TiO_2$) which is formed by an ion assisted deposition and the refractive index and the film thickness are 2.40 nm and 57.7 nm respectively. A fourth layer a4 (first aluminum oxide layer) is formed of aluminum oxide ($Al_2O_3$) which is formed by the vacuum deposition or the like and the refractive index and the film thickness thereof are 1.57 nm and 4.4 nm. The first dielectric multilayer film 3a is formed of the first layer a1, the second layer a2, the third layer a3, and the fourth layer a4.

A fifth layer a5 is formed of a silver layer which is formed by a vacuum deposition or the like and the refractive index and the film thickness are 0.06 nm and 17.0 nm respectively.

In the second dielectric multilayer film 3b, a sixth layer a6 is formed of zirconium oxide ($ZrO_2$) which is formed by vacuum deposition or the like and the refractive index and the film thickness thereof are 2.02 nm and 52.2 nm respectively. A seventh layer a7 (second aluminum oxide layer) is formed of aluminum oxide ($Al_2O_3$) which is formed by vacuum deposition or the like and the refractive index and the film thickness thereof are 1.57 nm and 4.4 nm respectively. An eighth layer a8 is formed of silicon oxide ($SiO_2$) which is formed by vacuum deposition or the like and the refractive index and the film thickness thereof are 1.46 nm and 641.0 nm respectively. A ninth layer a9 is formed of aluminum oxide ($Al_2O_3$) which is formed by vacuum deposition or the like and the refractive index and the film thickness are 1.57 nm and 16.5 nm. A tenth layer a10 is formed of silicon oxide ($SiO_2$) which is formed by vacuum deposition or the like and the refractive index and the film thickness thereof are 1.46 nm and 54.7 nm respectively. The second dielectric multilayer film 3b is formed of the sixth layer a6, the seventh layer a7, the eighth layer a8, the ninth layer 9a, and the tenth layer a10.

Spectral Characteristics

Figure 2A:
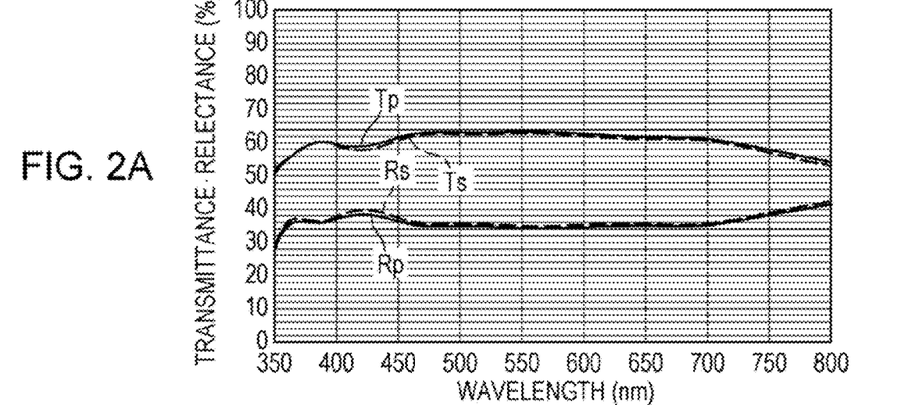
FIGS. 2A to 2C are explanatory diagrams showing an example of spectral characteristics of the half mirror according to the first embodiment of the invention.
Figure 2B:
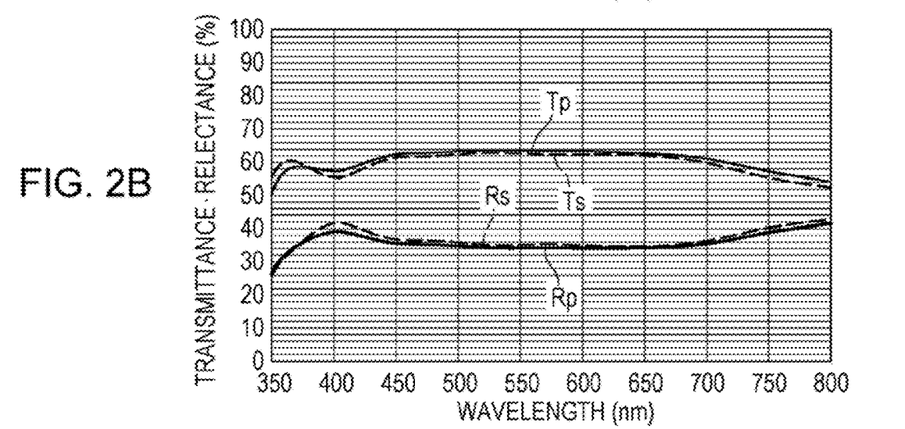
Figure 2C:
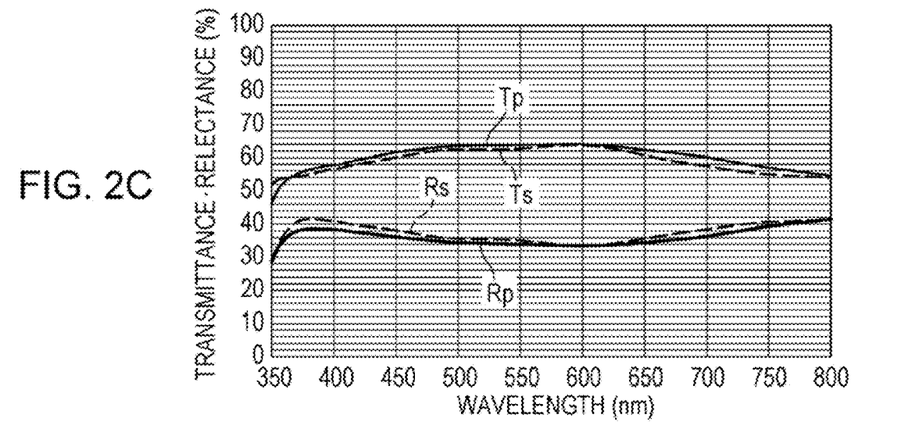

FIGS. 2A to 2C are explanatory diagrams showing an example of spectral characteristics of the optical element 10 according to the first embodiment of the invention. FIGS. 2A, 2B, and 2C are graphs showing spectral characteristics in cases where the incident angles with respect to the half mirror layer 3 are 20 degrees, 27 degrees, and 34 degrees. Further, in FIGS. 2A to 2C, the reflectance with respect to P polarization is represented by a solid line Rp, the reflectance with respect to S polarization is represented by a dashed line Rs, the transmittance with respect to the P polarization is represented by a solid line Tp, and the transmittance with respect to the S polarization is represented by a dashed line Ts.

As shown in FIGS. 2A to 2C, the reflectances over the entire visible area are the same and the transmittances over the entire visible area are the same as well in the optical element 10 of the embodiment. Further, over the entire visible area, regardless of the incident angles, the reflectance with respect to the P polarization is the same as the reflectance with respect to the S polarization and the transmittance with respect to the P polarization is the same as the transmittance with respect to the S polarization.

For example, in the wavelengths 470 nm, 540 nm, and 650 nm, in cases of the incident angles of 20 degrees, 27 degrees, and 34 degrees, the reflectances and the transmittances with respect to the light of respective wavelengths are as follows.

Wavelength: 470 nm
Incident angle: 20 degrees
P polarization: reflectance=35.0%, transmittance=63.1%
S polarization: reflectance=35.7%, transmittance=62.5%
Incident angle: 27 degrees
P polarization: reflectance=35.2%, transmittance=62.8%
S polarization: reflectance=36.5%, transmittance=61.8%
Incident angle: 34 degrees
P polarization: reflectance=35.3%, transmittance=62.6%
S polarization: reflectance=36.8%, transmittance=61.4%
Wavelength: 540 nm
Incident angle: 20 degrees
P polarization: reflectance=34.5%, transmittance=63.4%
S polarization: reflectance=35.1%, transmittance=62.8%
Incident angle: 27 degrees
P polarization: reflectance=34.1%, transmittance=63.7%
S polarization: reflectance=35.0%, transmittance=62.8%
Incident angle: 34 degrees
P polarization: reflectance=34.1%, transmittance=63.7%
S polarization: reflectance=35.3%, transmittance=62.5%
Wavelength: 650 nm
Incident angle: 20 degrees
P polarization: reflectance=35.1%, transmittance=61.8%
S polarization: reflectance=35.6%, transmittance=61.2%
Incident angle: 27 degrees
P polarization: reflectance=34.2%, transmittance=62.6%
S polarization: reflectance=34.7%, transmittance=62.0%
Incident angle: 34 degrees
P polarization: reflectance=34.5%, transmittance=62.3%
S polarization: reflectance=35.7%, transmittance=60.7%

Main Effects of Embodiment

As described above, in the embodiment, since the silver layer (fifth layer a5) is used as the metal layer of the optical element 10, a loss due to absorption is small when compared to the case of using aluminum. Further, while it is necessary to form an extremely thin layer having a thickness of 1 nm to 5 nm with high precision in aluminum, the thickness of a layer in a case of silver is only necessary to be equal to or greater than 10 nm, therefore, a film can be stably formed.

Moreover, in the embodiment, since a resin is used as the first translucent member 1, the degree of freedom in shape is high and reduction in weight can be attempted. In addition, there is a concern that moisture or an organic component desorbed from a resin can decrease the quality of the silver film and the dielectric layer (first aluminum oxide layer (fourth layer a4)) when a resin is used for the first translucent member 1, but a titanium oxide layer (third layer a3) is used as a high refractive index layer being provided on the first dielectric multilayer film 3a (lower layer side of the silver film) in the embodiment, so a film can be formed at a relatively low temperature by an ion assist method with such titanium oxide layer. Accordingly, it is possible for the titanium oxide layer (third layer a3) to prevent desorption of moisture or an organic component from a resin, and possible to prevent the moisture or the organic component desorbed from a resin from decreasing the quality of the silver layer or the dielectric layer (first aluminum oxide layer (fourth layer a4). Further, absorption and scattering of light on the silver layer become greater when the silver layer is directly provided on the titanium oxide layer (third layer a3), but absorption and scattering of light on the silver layer can be suppressed because the first aluminum oxide layer (fourth layer a4) is provided between the titanium oxide layer (third layer a3) and the silver layer in the embodiment.

Furthermore, since the zirconium oxide-based dielectric layer (zirconium oxide layer (sixth layer a6)) is used as the high refractive index layer being provided on the second dielectric multilayer film 3b side (upper layer side of the silver layer), damage to the silver layer is small which is different from the case of using a titanium oxide layer. In addition, the zirconium oxide-based dielectric layer can be formed as a dense film, so such layer can be used as a block for protecting the silver layer from moisture and degradation of optical characteristics of the optical element 10 generated due to a reaction with the moisture of the silver layer can be suppressed.

In addition, on the first dielectric multilayer film 3a, since the zirconium oxide layer (first layer a1) or the third aluminum oxide layer (second layer a2) is formed on the lower layer side of the titanium oxide layer (third layer a3), such zirconium oxide layer or an aluminum oxide layer can improve the adhesion property between the first translucent member 1 and the titanium oxide layer (third layer a3). Further, on the first dielectric multilayer film 3a, since the zirconium oxide layer (first layer a1) or the third aluminum oxide layer (second layer a2) is formed on the lower layer side of the titanium oxide layer (third layer a3) instead of the silicon oxide layer, there is an advantage that the spectral characteristics are excellent.

Second Embodiment

Figure 3A:
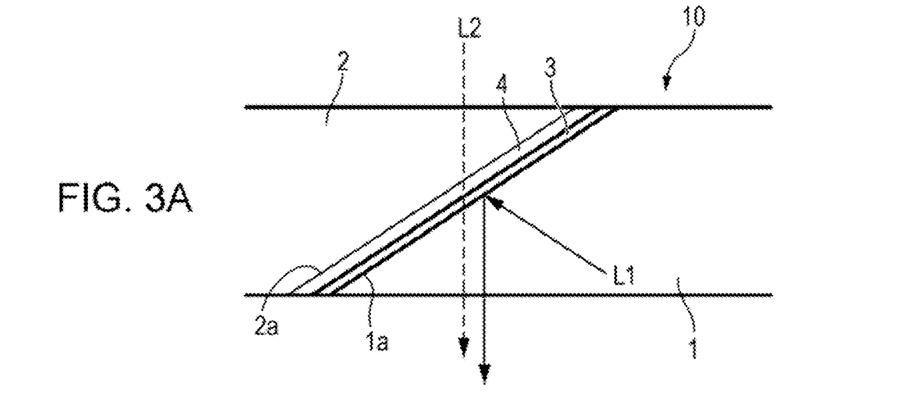
FIGS. 3A and 3B are explanatory diagrams showing an example of a half mirror according to a second embodiment.
Figure 3B:
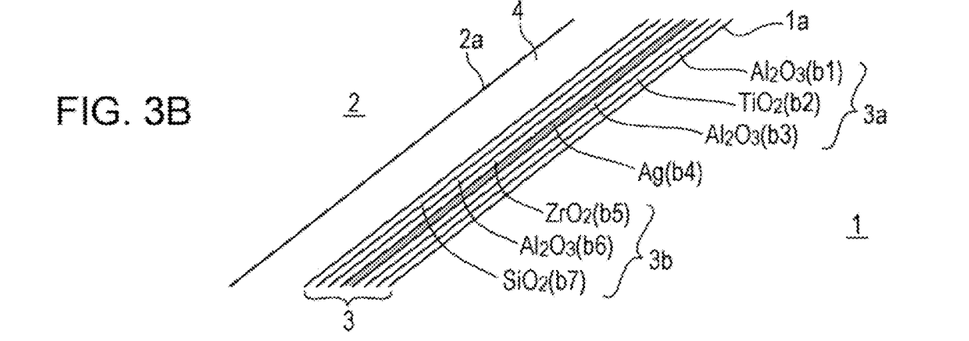
Figure 4A:
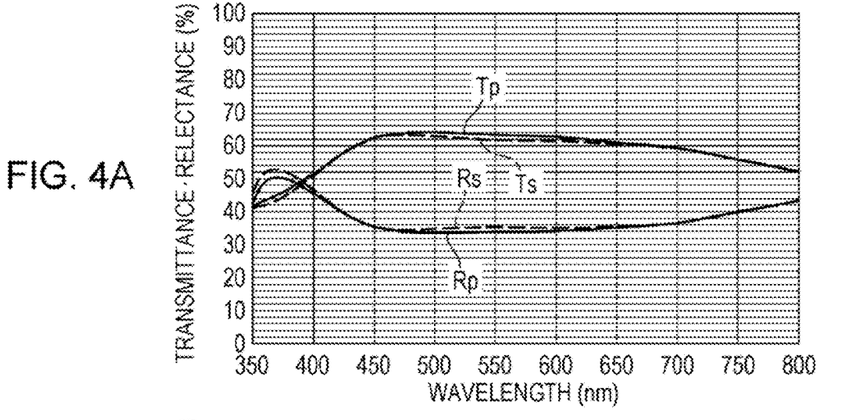
FIGS. 4A to 4C are explanatory diagrams showing an example of spectral characteristics of the half mirror according to the second embodiment of the invention.
Figure 4B:
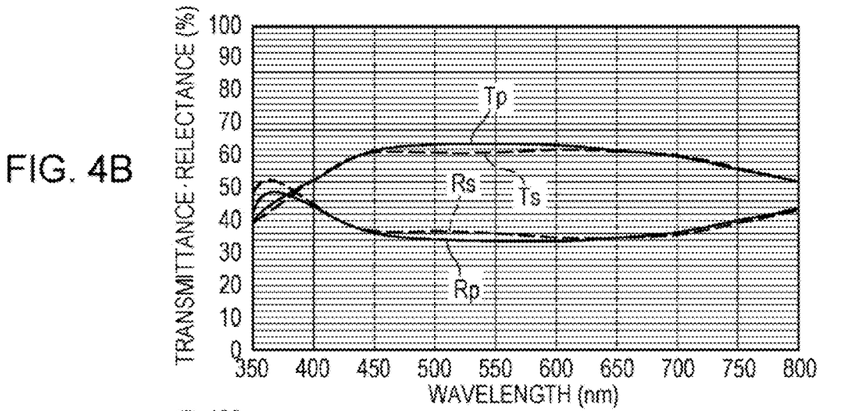
Figure 4C:
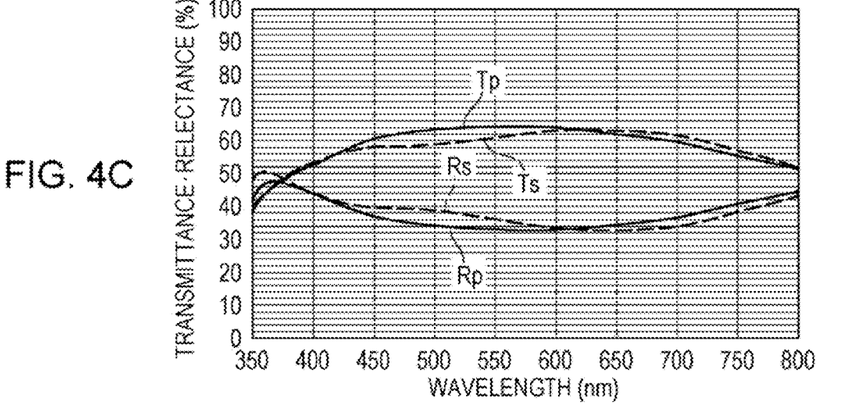

FIGS. 3A and 3B are explanatory diagrams showing an example of a half mirror according to a second embodiment of the invention. FIG. 3A is an explanatory diagram schematically showing an example of the cross-sectional configuration of the half mirror and FIG. 3B is an explanatory diagram showing an example of a half mirror layer. FIGS. 4A to 4C are explanatory diagrams showing an example of spectral characteristics of the optical element 10 according to the second embodiment of the invention, and FIGS. 4A, 4B, and 4C are graphs showing spectral characteristics in cases where the incident angles with respect to the half mirror layer 3 are 20 degrees, 27 degrees, and 34 degrees. Further, in FIGS. 4A to 4C, the reflectances with respect to P polarization are represented by a solid line Tp and the transmittances with respect to S polarization are represented by a dashed line Ts.

As shown in FIGS. 3A and 3B, the optical element 10 of the embodiment includes a first translucent member 1 made of a resin, a second translucent member 2 made of a resin, and a half mirror layer 3 formed between the first translucent member 1 and the second translucent member 2, and a translucent adhesive layer 4 formed between the half mirror layer 3 and the second translucent member 2 in the same manner as those of the first embodiment. In addition, the half mirror layer 3 includes a silver layer (Ag), a first dielectric multilayer film 3a provided between the silver layer and the first translucent member 1, and the second dielectric multilayer film 3b provided on the opposite side to the first translucent member 1 with respect to the silver layer.

As shown in Table 2, the first dielectric multilayer film 3a includes a first aluminum oxide layer in contact with the silver layer and a titanium oxide layer in contact with the first aluminum oxide layer on the first translucent member 1 side. In addition, the first dielectric multilayer film 3a includes a third aluminum oxide layer in contact with the titanium oxide layer on the opposite side to the first aluminum oxide layer. The second dielectric multilayer film 3b includes a zirconium oxide-based dielectric layer formed of a single film of zirconium oxide and a second aluminum oxide layer in contact with the zirconium oxide layer, and one of the second aluminum oxide layer and the zirconium oxide layer is in contact with the silver layer as shown in Table 2. In the embodiment, the zirconium oxide layer (fifth layer b5) is in contact with the silver layer (fourth layer b4).

More specifically, in the optical element 10 of the embodiment, the half mirror layer 3 is a multilayer film on which seven layers of thin films to be described below are laminated, and refractive indices and film thicknesses of respective layers are listed in Table 2. Further, in the embodiment, both of the first translucent member 1 and the second translucent member 2 are cyclo-olefin polymers (refractive index=1.54).

TABLE 2

| Layer | Material | Refractive index | Film thickness (nm) | |
|-------|----------|------------------|---------------------|----|
| b1 | Al$_2$O$_3$ | 1.57 | 78.3 | |
| b2 | TiO$_2$ | 2.4 | 51.4 | 3a |
| b3 | Al$_2$O$_3$ | 1.57 | 4.4 | |
| b4 | Ag | 0.06 | 18.3 | |
| b5 | ZrO$_2$ | 2.02 | 42.4 | |
| b6 | Al$_2$O$_3$ | 1.57 | 132.3 | 3b |
| b7 | SiO$_2$ | 1.46 | 70 | |

First, in the first dielectric multilayer film 3a of the half mirror layer 3, a first layer b1 (third aluminum oxide layer) is formed of aluminum oxide (Al$_2$O$_3$) which is formed by a vacuum deposition or the like and the refractive index and the film thickness thereof are 1.57 nm and 78.1 nm respectively. A second layer b2 is formed of titanium oxide (TiO$_2$) which is formed by an ion assisted deposition and the refractive index and the film thickness thereof are 2.40 nm and 51.4 nm respectively. A third layer b3 (first aluminum oxide layer) is formed of aluminum oxide (Al$_2$O$_3$) which is formed by the vacuum deposition or the like and the refractive index and the film thickness are 1.57 nm and 4.4 nm respectively. The first dielectric multilayer film 3a is formed of the first layer b1, the second layer b2, and the third layer b3.

A fourth layer b4 is formed of a silver layer which is formed by the vacuum deposition or the like and the refractive index and the film thickness thereof are 0.06 nm and 18.3 nm.

In the second dielectric multilayer film 3b, a fifth layer b5 is formed of zirconium oxide (ZrO2) which is formed by a vacuum deposition or the like and the refractive index and the film thickness are 2.02 nm and 42.4 nm respectively. A sixth layer b6 (second aluminum oxide layer) is formed of aluminum oxide (Al$_2$O$_3$) which is formed by vacuum deposition or the like and the refractive index and the film thickness thereof are 1.57 nm and 132.3 nm respectively. A seventh layer b7 is formed of silicon oxide (SiO$_2$) which is formed by vacuum deposition or the like and the refractive index and the film thickness thereof are 1.46 nm and 70.0 nm respectively. The second dielectric multilayer film 3b is formed of the fifth layer b5, the sixth layer b6, and the seventh layer b7.

As shown in FIGS. 4A to 4C, the reflectances over the entire visible area are the same and the transmittances over the entire visible area are the same as well in the optical element 10 of the embodiment. Further, over the entire visible area, regardless of the incident angles, the reflectance with respect to P polarization is the same as the reflectance with respect to S polarization and the transmittance with respect to the P polarization is the same as the transmittance with respect to the S polarization.

For example, in the wavelengths 470 nm, 540 nm, and 650 nm, in cases of the incident angles of 20 degrees, 27 degrees, and 34 degrees, the reflectances and the transmittances with respect to the light of respective wavelengths are as follows.
Wavelength: 470 nm
Incident angle: 20 degrees
P polarization: reflectance=34.1%, transmittance=63.6%
S polarization: reflectance=34.6%, transmittance=63.2%
Incident angle: 27 degrees
P polarization: reflectance=34.9%, transmittance=62.8%
S polarization: reflectance=36.4%, transmittance=61.3%
Incident angle: 34 degrees
P polarization: reflectance=35.6%, transmittance=62.0%
S polarization: reflectance=39.4%, transmittance=58.2%
Wavelength: 540 nm
Incident angle: 20 degrees
P polarization: reflectance=33.9%, transmittance=63.4%
S polarization: reflectance=35.3%, transmittance=61.9%
Incident angle: 27 degrees
P polarization: reflectance=33.7%, transmittance=63.6%
S polarization: reflectance=36.2%, transmittance=60.9%
Incident angle: 34 degrees
P polarization: reflectance=33.2%, transmittance=64.1%
S polarization: reflectance=36.7%, transmittance=60.4%
Wavelength: 650 nm
Incident angle: 20 degrees
P polarization: reflectance=35.2%, transmittance=61.0%
S polarization: reflectance=35.6%, transmittance=60.5%
Incident angle: 27 degrees
P polarization: reflectance=34.7%, transmittance=61.6%
S polarization: reflectance=34.6%, transmittance=61.3%
Incident angle: 34 degrees
P polarization: reflectance=34.5%, transmittance=61.9%
S polarization: reflectance=32.9%, transmittance=62.9%

As described above, in the embodiment, in the same manner as that of the first embodiment, since the silver layer (fourth layer b4) is used as the metal layer of the optical element 10, a loss due to absorption is small when compared to the case of using aluminum. Further, while it is necessary to form an extremely thin layer having a thickness of 1 nm to 5 nm with high precision in aluminum, the thickness of a layer in a case of silver is only necessary to be equal to or greater than 10 nm, therefore, a film can be stably formed. Moreover, in the embodiment, since a resin is used as the first translucent member 1, the degree of freedom in shape is high and reduction in weight can be attempted. In addition, since a titanium oxide layer (second layer b2) is used as a high refractive index layer being provided on the first dielectric multilayer film 3a (lower layer side of the silver layer) and a zirconium oxide-based dielectric layer (zirconium oxide layer (fifth layer b5)) is used as a high refractive index layer being provided on the second dielectric multilayer film 3b side (upper layer side of the silver layer), it is possible to prevent degradation of the optical characteristics of the optical element 10 due to the modification of the silver layer, which is the same effect as that of the first embodiment.

Third Embodiment

Figure 5A:
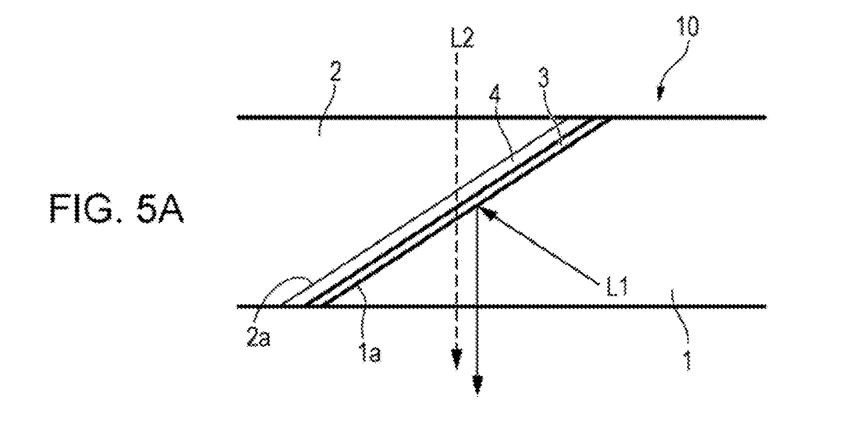
FIGS. 5A and 5B are explanatory diagrams showing an example of a half mirror according to a third embodiment of the invention.
Figure 5B:
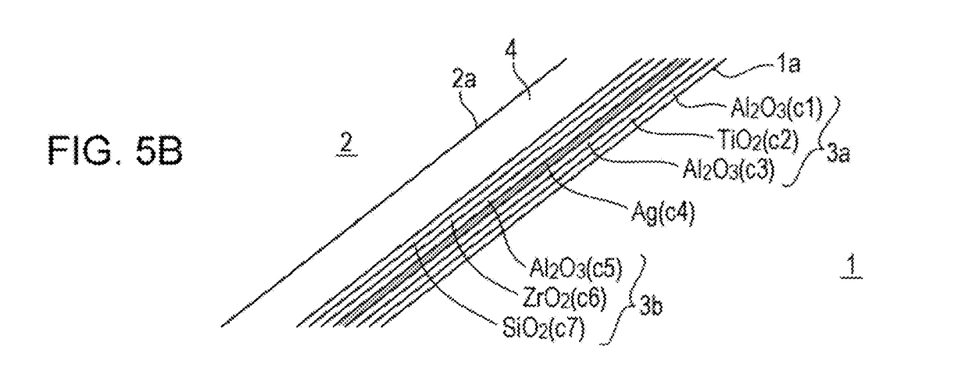
Figure 6A:
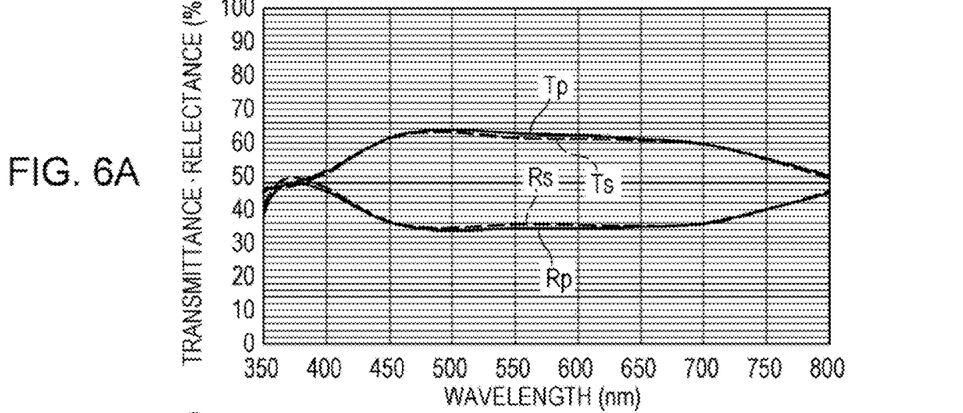
FIGS. 6A to 6C are explanatory diagrams showing an example of spectral characteristics of the half mirror according to the third embodiment of the invention.
Figure 6B:
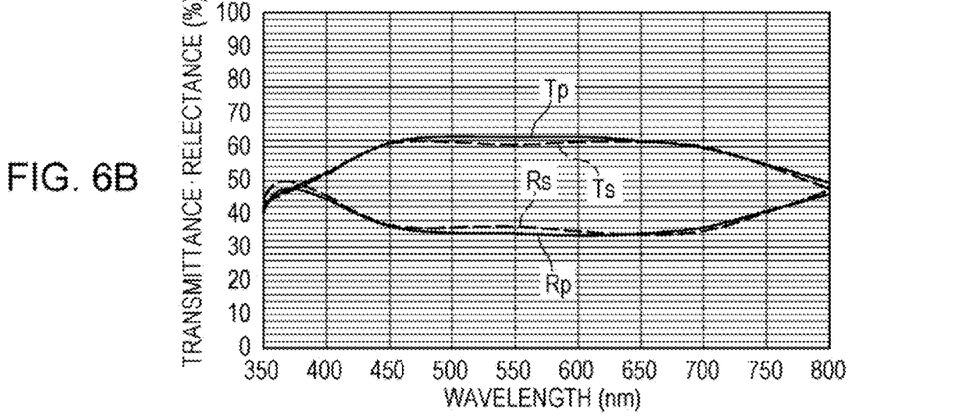
Figure 6C:
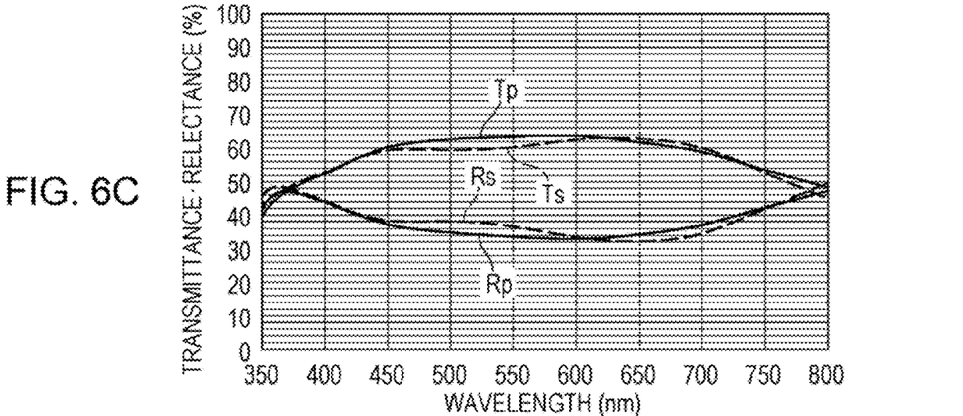

FIGS. 5A and 5B are explanatory diagrams showing an example of a half mirror according to a third embodiment of the invention. FIG. 5A is an explanatory diagram schematically showing an example of a cross-sectional configuration of the half mirror and FIG. 5B is an explanatory diagram showing an example of the half mirror layer. FIGS. 6A to 6C are explanatory diagrams showing an example of spectral characteristics of the optical element 10 according to the third embodiment of the invention, and FIGS. 6A, 6B, and 6C are graphs showing spectral characteristics in cases where the incident angles with respect to the half mirror layer 3 are 20 degrees, 27 degrees, and 34 degrees. Further, in FIGS. 6A to 6C, the reflectances with respect to P polarization are represented by a solid line Rp, the reflectances with respect to S polarization are represented by a dashed line Rs, the reflectances with respect to the P polarization are represented by a solid line Tp, and the transmittances with respect to the S polarization are represented by a dashed line Ts.

As shown in FIGS. 5A and 5B, the optical element 10 of the embodiment includes a first translucent member 1 made of a resin, a second translucent member 2 made of a resin, and a half mirror layer 3 formed between the first translucent member 1 and the second translucent member 2, and a translucent adhesive layer 4 formed between the half mirror layer 3 and the second translucent member 2 in the same manner as those of the first embodiment. In addition, the half mirror layer 3 includes a silver layer (Ag), a first dielectric multilayer film 3a provided between the silver layer and the first translucent member 1, and the second dielectric multilayer film 3b provided on the opposite side to the first translucent member 1 with respect to the silver layer.

As shown in Table 3, the first dielectric multilayer film 3a includes a first aluminum oxide layer in contact with the silver layer and a titanium oxide layer in contact with the first aluminum oxide layer on the first translucent member 1 side. In addition, the first dielectric multilayer film 3a includes a third aluminum oxide layer in contact with the titanium oxide layer on the opposite side to the first aluminum oxide layer. The second dielectric multilayer film 3b includes a zirconium oxide-based dielectric layer formed of a single film of zirconium oxide and a second aluminum oxide layer in contact with the zirconium oxide layer, and one of the second aluminum oxide layer and the zirconium oxide layer is in contact with the silver layer as shown in Table 3. In the embodiment, the second aluminum oxide layer (fifth layer c5) is in contact with the silver layer (fourth layer c4).

More specifically, in the optical element 10 of the embodiment, the half mirror layer 3 is a multilayer film on which seven layers of thin films to be described below are laminated, and refractive indices and film thicknesses of respective layers are listed in Table 3. Further, in the embodiment, both of the first translucent member 1 and the second translucent member 2 are acrylic resins (refractive index=1.50).

TABLE 3

| Layer | Material | Refractive index | Film thickness (nm) | |
|---|---|---|---|---|
| c1 | $Al_2O_3$ | 1.57 | 248.7 | } 3a |
| c2 | $TiO_2$ | 2.4 | 51.1 | |
| c3 | $Al_2O_3$ | 1.57 | 4.4 | |
| c4 | Ag | 0.06 | 18.7 | |
| c5 | $Al_2O_3$ | 1.57 | 4.4 | } 3b |
| c6 | $ZrO_2$ | 2.02 | 31.5 | |
| c7 | $SiO_2$ | 1.46 | 230.1 | |

First, in the first dielectric multilayer film 3a of the half mirror layer 3, a first layer c1 (third aluminum oxide layer) is formed of aluminum oxide ($Al_2O_3$) which is formed by a vacuum deposition or the like and the refractive index and the film thickness thereof are 1.57 nm and 248.7 nm respectively. A second layer c2 is formed of titanium oxide ($TiO_2$) which is formed by an ion assisted deposition and the refractive index and the film thickness thereof are 2.40 nm and 51.1 nm respectively. A third layer c3 (first aluminum oxide layer) is formed of aluminum oxide ($Al_2O_3$) which is formed by the vacuum deposition or the like and the refractive index and the film thickness are 1.57 nm and 4.4 nm respectively. The first dielectric multilayer film 3a is formed of the first layer c1, the second layer c2, and the third layer c3.

A fourth layer c4 is formed of a silver layer which is formed by the vacuum deposition or the like and the refractive index and the film thickness thereof are 0.06 and 18.7 nm.

In the second dielectric multilayer film 3b, a fifth layer c5 (second aluminum oxide layer) is formed of aluminum oxide ($Al_2O_3$) which is formed by a vacuum deposition or the like and the refractive index and the film thickness are 1.57 nm and 4.4 nm respectively. A sixth layer c6 is formed of zirconium oxide ($ZrO_2$) which is formed by vacuum deposition or the like and the refractive index and the film thickness thereof are 2.02 nm and 31.5 nm respectively. A seventh layer a7 is formed of silicon oxide ($SiO_2$) which is formed by vacuum deposition or the like and the refractive index and the film thickness thereof are 1.46 nm and 230.1 nm respectively. The second dielectric multilayer film 3b is formed of the fifth layer c5, the sixth layer c6, and the seventh layer c7.

As shown in FIGS. 6A to 6C, the reflectances over the entire visible area are the same and the transmittances over the entire visible area are the same as well in the optical element 10 of the embodiment. Further, over the entire visible area, regardless of the incident angles, the reflectance with respect to P polarization is the same as the reflectance with respect to S polarization and the transmittance with respect to the P polarization is the same as the transmittance with respect to the S polarization.

For example, in the wavelengths 470 nm, 540 nm, and 650 nm, in cases of the incident angles of 20 degrees, 27 degrees, and 34 degrees, the reflectances and the transmittances with respect to the light of respective wavelengths are as follows.
Wavelength: 470 nm
Incident angle: 20 degrees
P polarization: reflectance=34.6%, transmittance=63.1%
S polarization: reflectance=34.9%, transmittance=62.8%
Incident angle: 27 degrees
P polarization: reflectance=35.1%, transmittance=62.5%
S polarization: reflectance=35.9%, transmittance=61.7%
Incident angle: 34 degrees
P polarization: reflectance=35.9%, transmittance=61.6%
S polarization: reflectance=38.0%, transmittance=59.6%
Wavelength: 540 nm
Incident angle: 20 degrees
P polarization: reflectance=34.3%, transmittance=63.0%
S polarization: reflectance=35.4%, transmittance=61.8%
Incident angle: 27 degrees
P polarization: reflectance=34.2%, transmittance=63.0%
S polarization: reflectance=36.4%, transmittance=60.7%
Incident angle: 34 degrees
P polarization: reflectance=33.9%, transmittance=63.4%
S polarization: reflectance=37.1%, transmittance=59.9%
Wavelength: 650 nm
Incident angle: 20 degrees
P polarization: reflectance=34.8%, transmittance=61.1%
S polarization: reflectance=35.1%, transmittance=60.6%
Incident angle: 27 degrees
P polarization: reflectance=34.2%, transmittance=61.8%
S polarization: reflectance=33.9%, transmittance=61.5%
Incident angle: 34 degrees
P polarization: reflectance=34.4%, transmittance=61.7%
S polarization: reflectance=32.3%, transmittance=62.8%

As described above, in the embodiment, in the same manner as that of the first embodiment, since the silver layer (fourth layer c4) is used as the metal layer of the optical element 10, a loss due to absorption is small when compared to the case of using aluminum. Further, while it is necessary to form an extremely thin layer having a thickness of 1 nm to 5 nm with high precision in aluminum, the thickness of a layer in a case of silver is only necessary to be equal to or greater than 10 nm, therefore, a film can be stably formed. Moreover, in the embodiment, since a resin is used as the first translucent member 1, the degree of freedom in shape is high and reduction in weight can be attempted. In addition, since a titanium oxide layer (second layer c2) is used as a high refractive index layer being provided on the first dielectric multilayer film 3a (lower layer side of the silver layer) and a zirconium oxide-based dielectric layer (zirconium oxide layer (sixth layer c6)) is used as a high refractive index layer being provided on the second dielectric multilayer film 3b side (upper layer side of the silver layer), it is possible to prevent degradation of the optical characteristics of the optical element 10 due to the modification of the silver layer, which is the same effect as that of the first embodiment.

Another Configuration Example

In the above-described embodiments, the zirconium oxide-based dielectric layer formed of a single film of the zirconium oxide layer is used for the second dielectric multilayer film 3b, but a mixed film of zirconium oxide and titanium oxide may be used as such zirconium oxide-based dielectric layer.

In the above-described embodiments, the surface (first surface 1a) on the side on which the half mirror layer 3 is positioned in the first translucent member 1 and the surface (second surface 2a) on the side on which the adhesive layer 4 is positioned in the second translucent member 2 are planes, but one surface of the first surface 1a of the first translucent member 1 and the second surface 2a of the second translucent member 2 may include a convex curved surface and another surface may include a concave curved surface.

Configuration Example of Display Apparatus

Figure 7:
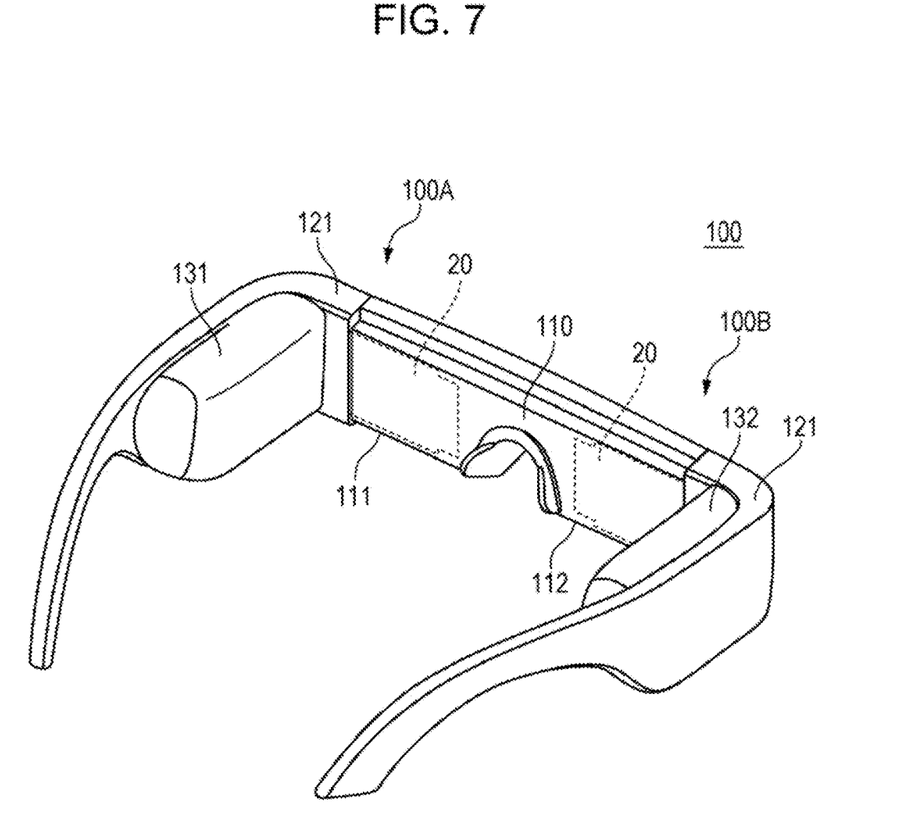
FIG. 7 is a perspective diagram showing an example of a display apparatus using a half mirror to which the invention is applied.

FIG. 7 is a perspective diagram showing an example of a display apparatus using an optical element 10 to which the invention is applied.

Figure 8A:
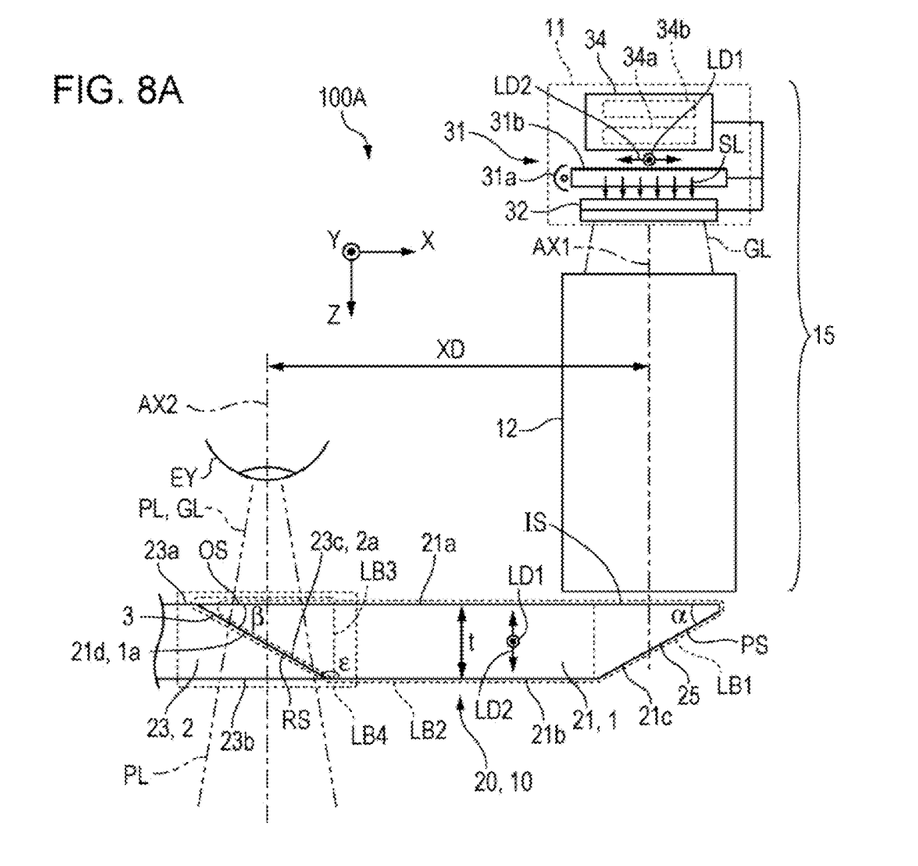
FIGS. 8A and 8B are explanatory diagrams showing an example of an optical system or the like of the display apparatus shown in FIG. 7.
Figure 8B:
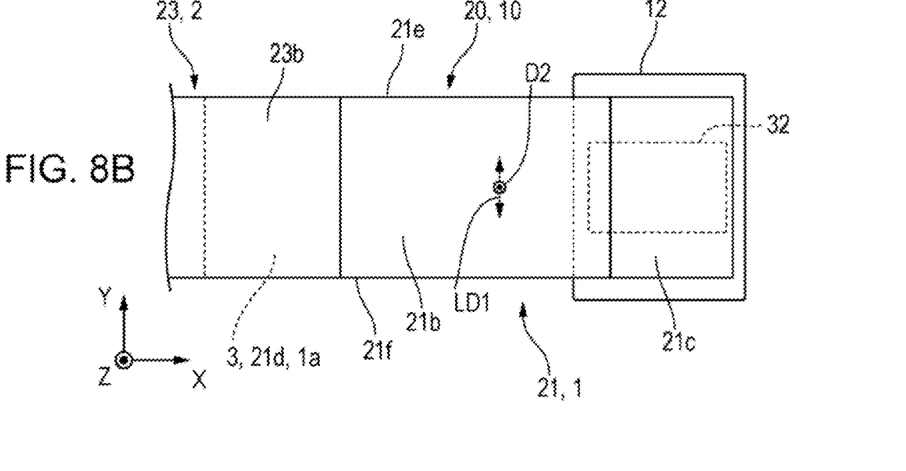

FIGS. 8A and 8B are explanatory diagrams showing an example of an optical system or the like of the display apparatus shown in FIG. 7, and FIGS. 8A and 8B are respectively a plan view and a front view.

The optical element 10 to which the invention is applied is used as a light guiding device 20 in the display apparatus 100 to be described below and a view finder for a camera. In this case, one of the first translucent member 1 and the second translucent member 2 is used as an light guiding member 21 to be described below and another member is used as a light transmitting member 23.

In the description below, a case in which the first translucent member 1 is used as the light guiding member 21 and the second translucent member 2 is used as the light transmitting member 23 is exemplified. Accordingly, the first surface 1a of the first translucent member 1 corresponds to a fourth reflection surface 21d of the light guiding member 21 and the second surface 2a of the second translucent member 2 corresponds to a third surface 23c of the light transmitting member 23.

The display apparatus 100 shown in FIG. 7 is a head-mounted display with an appearance of glasses, allows an observer wearing the display apparatus 100 to recognize image light, and allows the observer to observe an external image on a see-through basis. The display apparatus 100 includes an optical panel 110 covering the front of the eyes of the observer, a frame 121 supporting the optical panel 110, and a first driving unit 131 and a second driving unit 132 arranged in the periphery of the corner of the frame 121. The optical panel 110 includes a first panel portion 111 and a second panel portion 112, and the first panel portion 111 and the second panel portion 112 are plate-like components which are integrally connected at the center thereof. A first display apparatus 100A combining the first driving unit 131 and the first panel portion 111 on the left side of the drawing is for a left eye and functions as a virtual image display apparatus alone. Further, a second display apparatus 100B combining the second panel portion 112 and the second driving unit 132 on the right side of the drawing is for a right eye and functions as a virtual image display apparatus alone.

As shown in FIGS. 8A and 8B, the first display apparatus 100A includes an image light emitting device 15, the light guiding device 20, and the like. Here, the image light emitting device 15 corresponds to the first driving unit 131 in FIG. 7 and the light guiding device 20 corresponds to the first panel portion 111 in FIG. 7. In addition, the second display apparatus 100B shown in FIG. 7 has the same structure as that of the first display apparatus 100A, which is made by only reversing the left and the right side of the first display apparatus 100A, so the detailed description of the second display apparatus 100B will not be repeated.

The image light emitting device 15 includes an image forming device 11 and a projection optical system 12. The image forming device 11 of these includes and illuminating device 31 that emits two-dimensional illumination light SL, a liquid crystal display apparatus 32 that is a transmissive type spatial light modulating device, and a drive control unit 34 that controls an operation of the illumination device 31 and the liquid crystal display apparatus 32.

The illumination device 31 includes a light source 31a generating light with three colors of red, green, and blue, and a backlight light guiding unit 31b that diffuses light from the light source 31a to make a light flux of a rectangular cross section. The liquid crystal display apparatus 32 which is a liquid crystal panel spatially modulates the lamination light SL from the illumination device 31 and forms image light to be a display target of a moving image or the like. The drive control unit 34 includes a light source driving circuit 34a and a liquid crystal driving circuit 34b. The light source driving circuit 34a supplies power to the light source 31a of the illumination device 31 and emits the illumination light SL with stabilized brightness. The liquid crystal driving circuit 34b forms color image light which is a base of a video or a still image as a transmittance pattern by outputting an image signal or a driving signal with respect to the liquid crystal display apparatus 32. The projection optical system 12 is a collimator lens which allows the image light emitted from each point on the liquid crystal display apparatus 32 to be a light flux in a parallel state.

In the liquid crystal display apparatus 32, a first direction LD1 corresponds to an extension direction of a longitudinal cross section containing a specific line parallel to a first optical axis AX1 passing through the projection optical system 12 and a third reflection surface 21c of the light guiding member 21 to be described below, and a second direction LD2 corresponds to an extension direction of a transverse cross section containing a normal line of the first optical axis AX1 and the third reflection surface 21c. In other words, in the position of the liquid crystal display apparatus 32, the first direction LD1 corresponds to a longitudinal Y direction and the second direction LD2 corresponds to a transverse X direction.

The light guiding device 20 (optical element 10) is obtained by bonding the light guiding member 21 (first translucent member 1) and the light transmitting member 23 (second translucent member 2), and constitutes a block-like optical member extending in parallel with an XY surface as a whole.

In the light guiding device 20, the light guiding member 21 performs light guiding using total reflection by the first reflection surface 21a and the second reflection surface 21b, and there are a direction to be folded by reflection at the time of light guiding and a direction which is not folded by the reflection at the time of light guiding. In consideration of an image to be light-guided by the light guiding member 21, the transverse direction, that is, a confinement direction to be folded by plural times of reflections at the time of the light guiding is vertical (parallel to a Z axis) to the first reflection surface 21a and the second reflection surface 21b and corresponds to the second direction LD2 of the liquid crystal display apparatus 32 in a case of developing an optical path up to the light source side. The longitudinal direction, that is, a free propagation direction which is not folded by the reflection at the time of light guiding is parallel to (parallel to the Y axis) the first reflection surface 21a, the second reflection surface 21b, and the third reflection surface 21c, and corresponds to the first direction LD1 of the liquid crystal display apparatus 32 in a case of developing the optical path up to the light source side.

The light guiding member 21 is a prism-like member which is trapezoidal in a plan view and includes the first reflection surface 21a, the second reflection surface 21b, the third reflection surface 21c, and the fourth reflection surface 21d as side surfaces thereof. In addition, the light guiding member 21 is adjacent to the first reflection surface 21a, the second reflection surface 21b, the third reflection surface 21c, and the fourth reflection surface 21d, and includes an upper surface 21e and a lower surface 21f facing each other. Here, the first reflection surface 21a and the second reflection surface 21b extend along the XY surface and are separated from each other by a thickness t of the light guiding member. Further, the third reflection surface 21c is inclined at an acute angle α equal to or smaller than 45° with respect to the XY surface, and the fourth reflection surface 21d is inclined at an acute angle β equal to or smaller than 45° with respect to the XY surface. A first optical axis AX1 passing through the third reflection surface 21c and a second optical axis AX2 passing through the fourth reflection surface 21d are arranged to be parallel to each other and are separated from each other by a distance XD.

The light guiding member 21 is an integrally-formed product, but functionally, can be considered by dividing into a light incident portion LB1, a light guiding unit LB2, and a light emitting portion LB3. The light incident portion LB1 is a triangular prism-like portion, and includes a light incident surface IS which is a part of the first reflection surface 21a and the third reflection surface 21c facing the light incident surface IS. The light incident surface IS is a plane in the backside or the observer's side for capturing image light GL from the image light emitting device 15 and extends vertically to the first optical axis AX1 facing the projection optical system 12. The third reflection surface 21c is a rectangular total reflection mirror for reflecting the image light GL transmitting through the light incident surface IS and guiding the image light within the light guiding unit LB2, and includes a mirror layer 25. The mirror layer 25 is a total reflection coating and is formed by performing film formation by deposition of aluminum or the like on an inclined surface RS of the light guiding member 21. The third reflection surface 21c is inclined, for example, at an acute angle α of 25° to 27° with respect to the first optical axis AX1 of the projection optical system 12 or the XY surface, and allows the image light GL to be securely bonded to the light guiding unit LB2 by folding the image light GL which is incident from the light incident surface IS and moves toward a +Z direction as a whole such that the image light is allowed to be moved toward an −X direction close to a −Z direction.

The light guiding unit LB2 includes the first reflection surface 21a and the second reflection surface 21b for totally reflecting the image light folded by the light incident portion LB1 as two planes facing each other and extending parallel to the XY surface. The gap (thickness t of the light guiding member 21) between the first reflection surface 21a and the second reflection surface 21b is, for example, substantially 9 mm. Here, the first reflection surface 21a is on the backside or the observer's side close to the image light emitting device 15 and the second reflection surface 21b is on the front side or the external environment side far from the image light emitting device 15. In this case, the first reflection surface 21a is a common surface portion between the light incident surface IS and a light emitting surface OS to be described below. The first reflection surface 21a and the second reflection surface 21b are total reflection surfaces using a difference between refractive indices and reflection coating such as a mirror layer or the like is not performed thereon.

The image light GL reflected on the third reflection surface 21c of the light incident portion LB1 is incident to the first reflection surface 21a and then totally reflected. Next, the image light GL is incident to the second reflection surface 21b and then totally reflected. The image light is guided to the backside of the light guiding device 20, that is, a −X side on which the light emitting portion LB3 is provided by repeating this process. Further, since the reflection coating is not performed on the first reflection surface 21a and the second reflection surface 21b, the external environment light or the external light incident to the second reflection surface 21b from the external environment side passes through the light guiding unit LB2 with high transmittance. In other words, the light guiding unit LB2 is a see-through type capable of seeing through the external environment image.

The light emitting portion LB3 is a triangular prism-like portion and includes the light emitting surface OS which is a part of the first reflection surface 21a and the fourth reflection surface 21d facing the light emitting surface OS. The light emitting surface OS is a plane on the front side for emitting the image light GL toward an eye EY of the observer, becomes a part of the first reflection surface 21a in the same manner as that of the light incident surface IS, and extends vertically to the second optical axis AX2. A distance XD between the second optical axis AX2 passing through the light emitting portion LB3 and the first optical axis AX1 passing through the light incident portion LB1 is set to, for example, 50 mm in consideration of the width or the like of the head of the observer. The fourth reflection surface 21d is a rectangular flat surface for emitting the image light GL to the outside of the light emitting portion LB3 by reflecting the image light GL incident through the first reflection surface 21a and the second reflection surface 21b. The half mirror layer 3 is provided in association with the fourth reflection surface 21d. The half mirror layer 3 is a reflection film having optical transparency and is formed by performing film formation of a metal reflection film or a dielectric multilayer film on an inclined surface PS of the light guiding member 21.

The fourth reflection surface 21d is inclined, for example, at an acute angle α of 25° to 27° with respect to the XY surface or the second optical axis AX2 vertical to the first reflection surface 21a and passes through the light emitting surface OS by partially reflecting the image light GL incident through the second reflection surface 21b and the first reflection surface 21a of the light guiding member LB2 and by folding the image light GL so as to move toward a −Z direction as a whole, by the half mirror layer 3. Further, the image light GL transmitting through the fourth reflection surface 21d is incident to the light transmitting member 23 and is not used for formation of a video.

The light transmitting member 23 has the same refractive index as that of a main body of the light guiding member 21 and includes the first surface 23a, the second surface 23b, and the third surface 23c. The first surface 23a and the second surface 23b extend along the XY surface. Further, the third surface 23c is inclined with respect to the XY surface and is arranged to be in parallel with and face the fourth reflection surface 21d of the light guiding member 21. In other words, the light transmitting member 23 is a member having a wedge-shaped portion being interposed between the second surface 23b and the third surface 23c.

In the light transmitting member 23, the first surface 23a is arranged on an extension plane of the first reflection surface 21a provided on the light guiding member 21 and is on the backside close to the observer's eyes EY, and the second surface 23b is arranged on an extension plane of the second reflection surface 21b provided on the light guiding member 21 and is on the front side far from the observer's eyes EY. The third surface 23c is a rectangular transmitting surface bonded to the fourth reflection surface 21d of the light guiding member 21 by an adhesive. An angle between the first surface 23a and the third surface 23c is equivalent to an angle ∈ between the second reflection surface 21b and the fourth reflection surface 21d of the light guiding member 21, and an angle between the second surface 23b and the third surface 23c is equivalent to an angle β between the first reflection surface 21a and the third reflection surface 21c of the light guiding member 21.

The light transmitting member 23 and the light guiding member 21 constitute a fluoroscopic portion LB4 in both of the bonded portions and the periphery thereof. In other words, since the reflection coating is not performed on the first surface 23a and the second surface 23b, external environment light PL is allowed to be transmitted therethrough with high transmittance in the same manner as that of the light guiding unit LB2 of the light guiding member 21. The third surface 23c can be transmitted by the external environment light PL with high transmittance, but the external environment light PL transmitting through the third surface 23c is dimmed because the fourth reflection surface 21d of the light guiding member 21 includes the half mirror layer 3. That is, the observer observes superimposed light of the dimmed image light GL and the dimmed external environment light PL.

Further, a reflective type spatial light modulating device which allows light from the light source to be reflected on a mirror such as MEMS or the like to form an image may be used as the image forming device 11.

The entire disclosure of Japanese Patent Application No. 2013-103792, filed May 16, 2013 is expressly incorporated by reference hereHin.

What is claimed is:

1. An optical element, comprising:
a first translucent member that contains a resin material;
a half mirror film that is formed on at least one surface of the first translucent member;
a second translucent member that is positioned above the opposite side to the first translucent member with respect to the half mirror film, and
an adhesive layer that is positioned between the half mirror film and the second translucent member, the adhesive layer including a curable polymer material,
wherein the half mirror film includes
a silver film;
a first dielectric multilayer film that is positioned between the silver film and the first translucent member; and
a second dielectric multilayer film that is positioned on the opposite side to the first translucent member with respect to the silver film,
the first dielectric multilayer film includes
a first aluminum oxide film that is in contact with the silver film
a titanium oxide film that is in contact with the first aluminum oxide film on the first translucent member side; and
a zirconium oxide film that is positioned between the first aluminum oxide film and the first translucent member,
the second dielectric multilayer film includes
a zirconium oxide-based dielectric film that contains zirconium oxide; and
a second aluminum oxide film that is in contact with the zirconium oxide-based dielectric film, and
one of the second aluminum oxide film and the zirconium oxide-based dielectric film is in contact with the silver film.

2. The optical element according to claim 1, wherein the zirconium oxide-based dielectric film is a mixed film of zirconium oxide and titanium oxide.

3. The optical element according to claim 1, wherein the first dielectric multilayer film contains a third aluminum oxide film that is in contact with the titanium oxide film on the opposite side to the first aluminum oxide film.

4. The optical element according to claim 1, wherein the zirconium oxide-based dielectric film is in contact with the silver film on the second dielectric multilayer film.

5. The optical element according to claim 1, wherein the second aluminum oxide film is in contact with the silver film on the second dielectric multilayer film.

6. The optical element according to claim 1,
wherein the second translucent member has the same refractive index as that of the first translucent member.

7. A display apparatus that includes the optical element according to claim 1, comprising:
an image light emitting device that emits image light,
wherein the optical element includes a light incident portion to which the image light from the image light emitting device is incident, and a light emitting portion in which at least a part of the image light incident from the light incident portion is reflected on the half mirror film to be emitted.

8. A display apparatus that includes the optical element according to claim 2, comprising:
an image light emitting device that emits image light,
wherein the optical element includes a light incident portion to which the image light from the image light emitting device is incident, and a light emitting portion in which at least a part of the image light incident from the light incident portion is reflected on the half mirror film to be emitted.

9. A display apparatus that includes the optical element according to claim 3, comprising:
an image light emitting device that emits image light,
wherein the optical element includes a light incident portion to which the image light from the image light emitting device is incident, and a light emitting portion in which at least a part of the image light incident from the light incident portion is reflected on the half mirror film to be emitted.

10. A display apparatus that includes the optical element according to claim 4, comprising:
an image light emitting device that emits image light,
wherein the optical element includes a light incident portion to which the image light from the image light emitting device is incident, and a light emitting portion in which at least a part of the image light incident from the light incident portion is reflected on the half mirror film to be emitted.

11. A display apparatus that includes the optical element according to claim 5, comprising:
an image light emitting device that emits image light,
wherein the optical element includes a light incident portion to which the image light from the image light emitting device is incident, and a light emitting portion in which at least a part of the image light incident from the light incident portion is reflected on the half mirror film to be emitted.

12. A display apparatus that includes the optical element according to claim 6, comprising:
an image light emitting device that emits image light,
wherein the optical element includes a light incident portion to which the image light from the image light emitting device is incident, and a light emitting portion in which at least a part of the image light incident from the light incident portion is reflected on the half mirror film to be emitted.

13. The optical element according to claim 1, wherein the first dielectric multilayer film includes a third aluminum oxide film between the first aluminum oxide film and the first translucent member.

14. The optical element according to claim 1, wherein the silver film has a thickness that is equal to or greater than 10 nm and that is less than or equal to 18.7 nm.

15. The optical element according to claim 1, wherein the adhesive layer directly contacts each of the half mirror film and the second translucent member.

* * * * *